United States Patent [19]

Etheridge

[11] Patent Number: 4,774,980

[45] Date of Patent: Oct. 4, 1988

[54] PILOTED WELLHEAD FLOW CONTROL VALVE

[76] Inventor: Reggie H. Etheridge, 4514 Brittmore, Houston, Tex. 77041

[21] Appl. No.: 13,213

[22] Filed: Feb. 6, 1987

Related U.S. Application Data

[63] Continuation-in-part of Ser. No. 783,551, Oct. 30, 1985, Pat. No. 4,662,603.

[51] Int. Cl.⁴ .......................................... F16K 31/122
[52] U.S. Cl. .................................. 137/488; 137/492.5; 251/63.5
[58] Field of Search ...................... 137/488, 485, 492.5; 251/63.5, 63.3, 62, 122

[56] References Cited

U.S. PATENT DOCUMENTS

| | | | |
|---|---|---|---|
| 3,788,341 | 1/1974 | Athy | 137/488 X |
| 4,335,744 | 1/1982 | Bey | 251/63.5 X |
| 4,337,788 | 7/1982 | Seger | 251/122 X |
| 4,461,450 | 7/1984 | Soland | 251/63.5 |
| 4,503,878 | 3/1985 | Taylor | 251/122 X |

Primary Examiner—Alan Cohan
Attorney, Agent, or Firm—Guy E. Matthews

[57] ABSTRACT

Wellhead flow control valve including a valve body, a hydraulic linear actuator means connected to valve body in alignment with operating chamber. Actuator has Belleville spring return. A seat sleeve carrying a valve seat and an internal lining mounts at outlet of operating chamber. Drive shaft moves flow control member of prescribed configuration into and out of valve seat sleeve. Flow control member and valve seat cause complete flow closure. Hydraulic conduit connects into actuator to admit hydraulic fluid to move piston and to compress spring. Activator is responsive to a pilot signal for: activating a pump control switch; to permit operation of pumps; activating a by-pass valve switch to keep closed a by-pass valve between conduit and sump of pump; and activating a blocking valve switch to keep open a blocking valve connected between pump and actuator. Flow throttling valve connected into conduit between actuator and other valve control apparatus to adjustably control rate of travel of piston by adjusting flow rate. Pressure sensing means connects into product pipe downstream from control valve and connected: to switch by-pass valve switch to open hydraulic by-pass valve and to switch pump control switch to closed position to stop pump and to close control valve when prescribed to high product pressure occurs; and to switch pump control switch to start pump and to switch by-pass valve to close hydraulic pass valve to stop and to open control valve when a prescribed lower product pressure occurs.

10 Claims, 2 Drawing Sheets

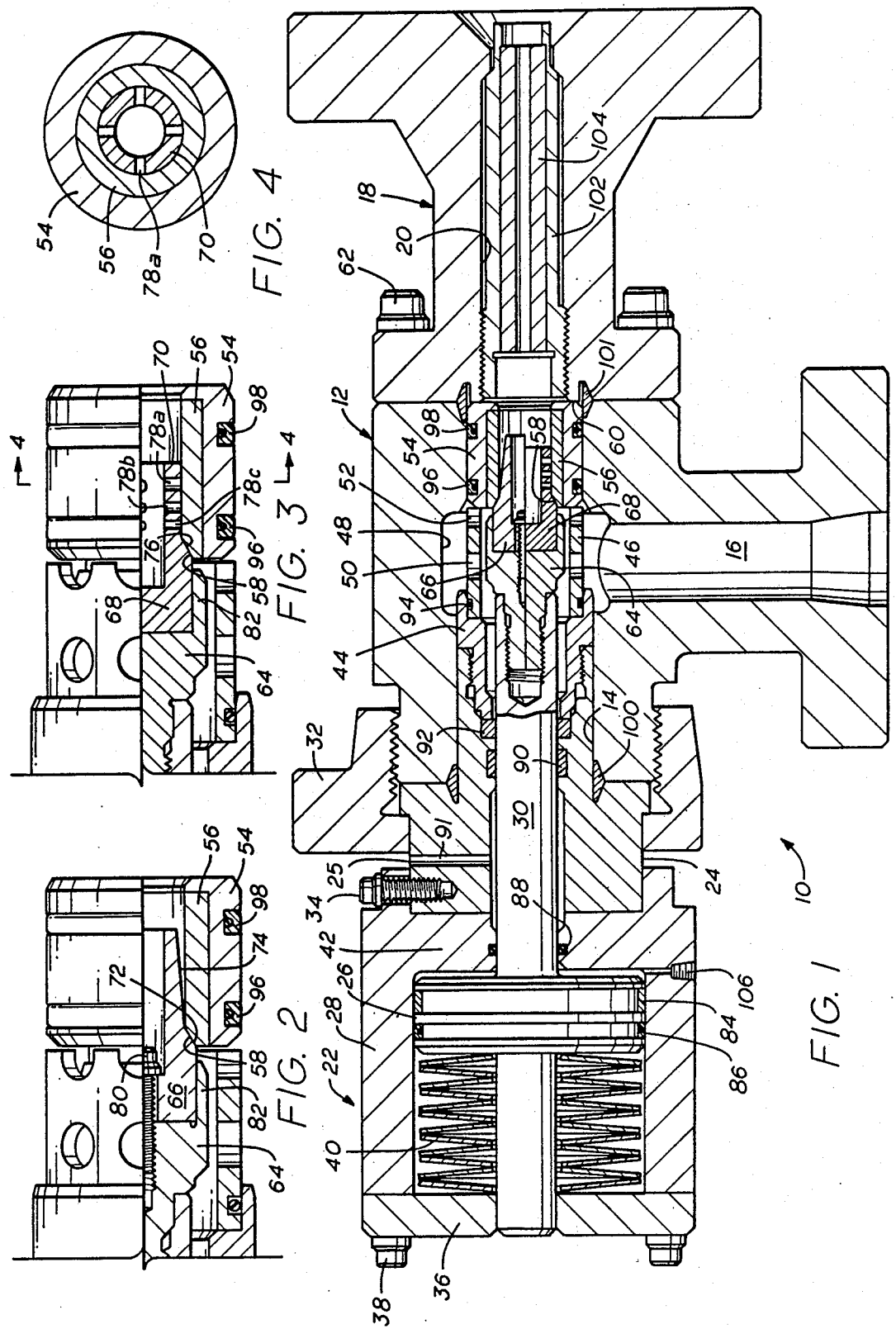

PILOTED WELLHEAD FLOW CONTROL VALVE

This application is a division of application Ser. No. 783,551, filed 10/3/85, now U.S. Pat. No. 4,662,603, issued May 5, 1987.

FIELD OF THE INVENTION

This invention generally relates to control valves for the wellheads of oil and gas wells and more particularly pertains to a wellhead control valve provided with adjustable flow control and also provided with complete flow shut-off. The control valve of the present invention is also related to drilling chokes and may be used in lieu of drilling chokes under some conditions.

BACKGROUND OF THE INVENTION

Many types and kinds of valves have been developed over the years for wellhead pressure and flow control. Many companies manufacture and market this kind of equipment. Examples are: Seaboard Wellhead, Inc., Houston, Tex.; Cameron Iron Works, Inc., Houston, Tex.; FMC Corporation, Houston, Tex.; Sii Willis (Division of Smith International), Houston, Tex.; W-K-M (Division of Joy Manufacturing) Houston, Tex.; Thornhill Craver Company, (Division of Joy Manufacturing) Houston, Tex.; Gray Tool Company, Subsidiary of Combustion Engineering, Houston, Tex.; and others.

OBJECTS OF THE INVENTION

One object of the present invention is to eliminate the need for multiple surface safety-block valves.

Another object of the invention is to prevent wear and damage to block valves that are not designed to be throttled by permitting such valves to be closed with no flow.

Another object of the invention is to slowly reduce flow through the valve until a flow-positive shut-off is achieved and thereby eliminate slam and surge in the well.

Another object of the invention is to permit pilot pressure sensors to be expanded to include various non-pressure safety items.

Another object of the invention is to operate the choke control valve of the present invention to automatically clear foreign matter entrained with the petroleum product.

SUMMARY OF THE INVENTION

The above and other objects and advantages of the invention are attained by a pilot operated wellhead flow control valve which includes a valve body defining a cylindrical valve chamber which extends through the body, and a flow inlet passage intersecting the operating chamber. A flow outlet member defines a cylindrical discharge outlet passage connected to the valve body with the outlet passage in alignment with the operating chamber. An hydraulic linear actuator is removably connected in alignment with the operating chamber through a retainer member. The actuator includes a piston enclosed in a cylinder, and a drive shaft extending into the valve chamber. A compressive "Belleville" spring return is biased between the piston and a retainer cap to urge the drive shaft into the operating chamber. A seat sleeve having a valve seat and an internal lining of a prescribed material is mounted at the flow outlet of the valve chamber and fixed by a cylindrical flow cage which is spaced and retained in the valve chamber across the inlet passage by the retainer member. A carrier member carries a flow control member of prescribed configuration into and out of the valve seat sleeve to close off flow through the sleeve with extension of the drive shaft into the valve chamber and to fully open the sleeve to product flow with the retraction of the drive shaft. The control member and the internal lining is provided of highly erosive resistant material. The flow control member and the valve seat define complementary tapered seats to cause complete flow closure with extension of the drive shaft. The flow control member defines a nose of prescribed taper angle extending from its seat. The flow control member alternately may define a hollow, cylindrical wall having flow passages of prescribed number and spacing to permit prescribed flow rates through the flow passages in accordance with the distance the flow control member is withdrawn from the seat sleeve.

The invention also includes pilot operated control apparatus which connects into the hydraulic linear actuator above described. A hydraulic conduit means is connected into the cylinder of the actuator to admit hydraulic fluid under pressure to move the piston and drive shaft and to compress the resilient spring. A hydraulic pump supplies the hydraulic fluid through a conduit system to the linear actuator. A disengageable activator for activating the control apparatus into operating mode responsive to a pilot signal of prescribed magnitude includes, (1) activating a pump control switch to run the hydraulic pump, (2) activating a by-pass valve switch to keep closed a by-pass valve and fluid connection between the conduit system and the sump of the pump, (3) activating a blocking valve switch to keep open a blocking valve connected into the conduit system between the pump and the actuator. An adjustable flow throttle valve connected into the conduit system between the actuator and the remainder of the system is provided to adjustably control the rate of travel of the piston in the actuator by adjusting the hydraulic fluid flow rate into and out of the actuator. A connection is made into the product type downstream of the control valve and connected further to: (1) Switch the by-pass valve switch to open the hydraulic by-pass valve and to switch the pump control switch to closed and thereby to stop the pump and to close the control valve when a prescribed high product pressure occurs; and (2) To switch the pump control switch to start the pump and switch the by-pass valve to close the hydraulic by-pass valve and thereby to open the control valve when a prescribed lower product pressure occurs.

BRIEF DESCRIPTION OF THE DRAWING

FIG. 1 is a longitudinal cross-sectional view of the control valve including a flow outlet member and also including a linear hydraulic actuator.

FIG. 2 is a first embodiment of FIG. 1 showing a first configuration of the flow control member as actuated into and out of the valve seat in a seat ring.

FIG. 3 illustrates a second embodiment showing of the valve member of the control valve as provided with a valve member of a second configuration.

FIG. 4 is a transverse cross-sectional view taken along the line 4—4 of FIG. 3.

DESCRIPTION OF THE PREFERRED EMBODIMENT

Figure 5:
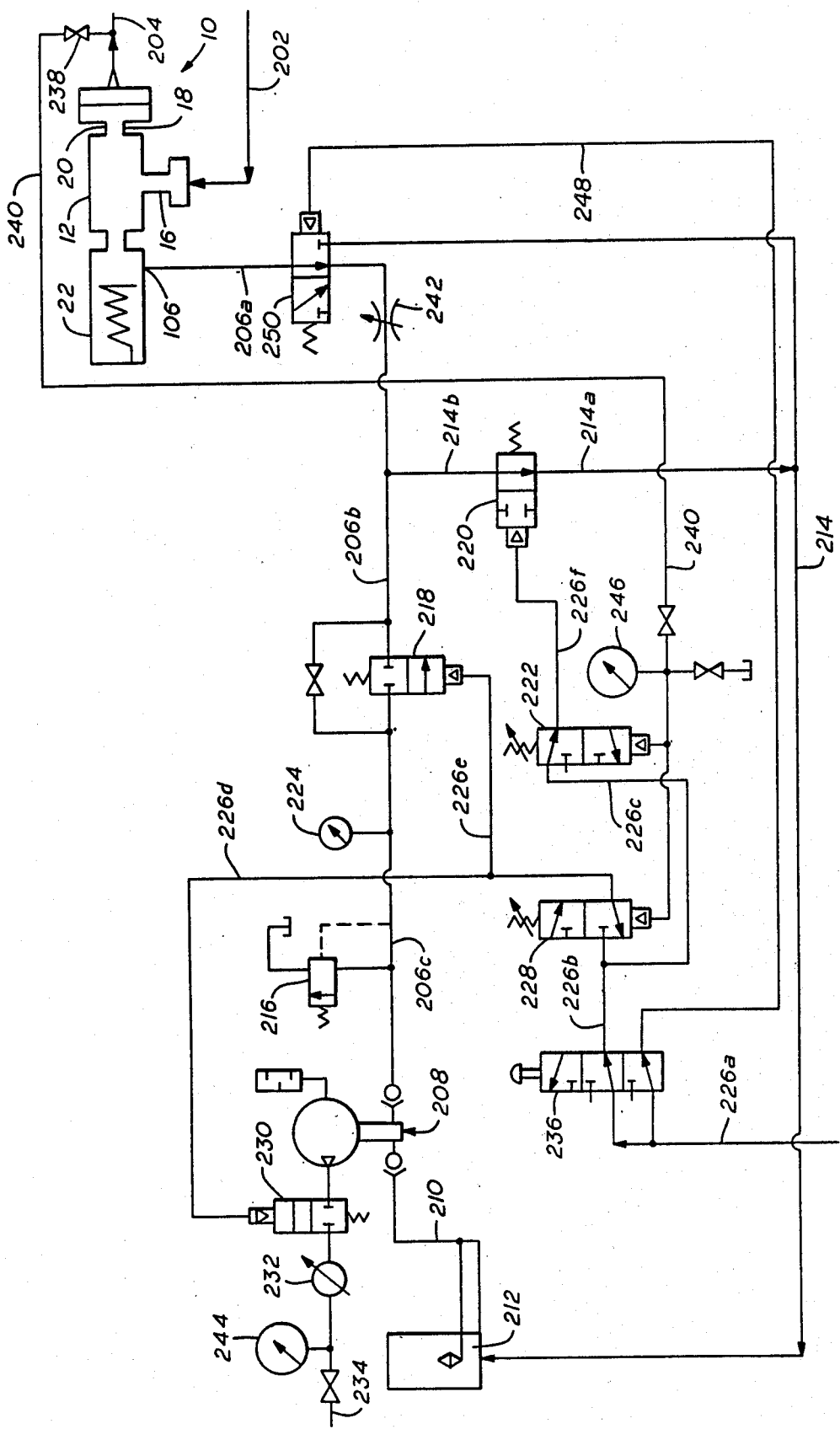
FIG. 5 is a schematic diagram of the valve control apparatus for the control valve as connected into the hydraulic actuator shown in FIG. 1 and also into the product pipe downstream of the flow control valve.

Looking now to FIG. 1, there is shown the flow control valve 10 of the present invention which includes a valve body 12. Valve body 12 defines a cylindrical operating chamber 14 extending through the body and a flow inlet passage 16 which intersects the operating chamber 14. A flow outlet member 18 defines a cylindrical discharge outlet passage 20 and is connected to the valve body 12 with the outlet passage 20 in alignment with the cylindrical operating chamber 14.

A hydraulic linear actuator assembly 22 is shown removably connected in alignment with the cylindrical valve chamber of the valve body 12 through a retainer adapter 24. The linear actuator includes a piston 26 enclosed in a cylinder 28 and a drive shaft 30 which extends into the valve chamber 14. A "Belleville" spring assembly is mounted in compression between the piston 26 and a retainer cover 36

The retainer adapter 24 extends into the chamber 14 for a distance as shown and is connected to the valve body 12 by means of a threaded hammer lock coupler 32 as shown. The retainer adapter is connected to the linear actuator 22 by means of radially spaced apart cap screws 34 as shown.

The drive shaft 30 extends through the piston 26 and is guided at its distal end by means of a cylindrical hole defined in a retainer cover 36 which is connected to the walls of cylinder 28 by a plurality of radially spaced apart cap screws 38 as shown. The piston 26 is biased away from the retainer cover 36 by means of a group of Belleville springs 40 mounted with sufficient pre-compression to drive the piston 26 and drive shaft 30 into abuttment with the end bulkhead 42 of the cylinder 28.

Mounted in threaded connection into the end of retainer adaptor 24 is a cage retainer 44 which serves to support and retain a flow cage 46 within an enlarged annular chamber 48. Chamber 48 is defined within passageway chamber 14 at the intersection of the flow inlet passage 16 such that fluids entering inlet passage 16 can flow freely around in the chamber 48 and pass through holes 50 and slots 52 defined in flow cage 46.

The flow cage 46 abuts a cylindrical and annular seat sleeve 54 which in turn abuts against a shoulder 60 provided by the outlet member 18 as connected.

The seat sleeve 54 carries a hardened tungsten carbide lining 56 which defines, at its flow inlet end, a tapered female seat 58. The seat sleeve 54 is best shown in FIGS. 2 and 3.

When provided as shown, the retainer adaptor 24, the cage retainer 44, the flow cage 46, and the seat sleeve 54 are stacked together as shown and are retained in operating chamber 14 by the coupler 32 and the shoulder 60. Shoulder 60 is defined by outlet member 18 when connected as shown by threaded cap screw fasteners 62.

Mounted in axially aligned threaded connection in the end of drive shaft 30 is a carrier 64 which is provided to carry either a male control member 66 of prescribed configuration and taper, or a male control member 68 of configuration having a tapered male seat and a cylindrical annular cylinder 70 extending from the seat and into the lining 56.

The control member 66 is best shown is FIG. 2. As seen, the control member 66 has a male tapered seat 72 adapted to match and fit within the female seat 58. The included angle of the seat 72 may be sixty degrees (60°). Extending from the seat 72 of member 66 is a nose member 74 having a taper having an included angle of twelve degrees (12°), for example.

In operation, as the member 66 is withdrawn from the sleeve 54, the seating seal between seat 58 and 72 is first opened. Thereafter, the clearance between the lining 56 and the nose 74 gives increasing flow clearance as the member 66 is withdrawn.

FIG. 3 best illustrates the flow control member 68. The member 68 also defines a tapered male seat 76 which matches in sealed relationship with female seat 58 as previously described. The annular and cylindrical nose 70 of member 68 is provided with a plurality of spaced apart flow passages 78a, 78b and 78c as illustrated. As noted, these passageways are linearly spaced apart and each set of passages 78c, 78b, and 78a is of increasing diameter toward the end of the control nose 70.

FIG. 4 best shows the passages 78a as being 4 in number and disposed in opposed sets of two located at ninety degrees (90°). In operation, high pressure and high velocity fluids enter into each set of the passages 78c, 78b and 78a as permitted by the withdrawn position of the valve member 68. The flow from the opposing passages 78c, enter the cylindrical nose 70 in opposed relationship and thereby null out a substantial portion of the forces created by the high velocity and thereby lower the velocity to a less eroding condition.

In FIG. 2, the carrier 64 retains the control member 66 by means of a threaded connector 80. However, the retaining and connecting force actually used is a shrink fit of the extending collar 82 of carrier 64 around the base of flow control member 66 as shown. Thus, while the connector 80 may be useful to pull the control member 66 into the collar 82, the subsequent shrink fit is all that is really needed in operation.

In FIG. 3, the collar 82 of carrier 64 is also shown in shrink fitted relation with the base of the flow control member 68.

The piston 26 slides within the cylinder 28 on a wear ring 84 which may be provided of teflon, polypropylene, or the like.

The piston 26 is sealed by use of a crown seal 86 disposed within an O-ring groove about the piston 26. A crown seal as shown is made up of a grooved ring provided of teflon, polypropylene, or other suitable material, with the groove being filled with an O-ring which serves in part as an expander and in part as a seal at the bottom of the O-ring groove. A crown seal 88 is mounted in an O-ring groove of the bore through bulkhead 42 to seal the shaft 30 from leakage.

Shown at 91 is a vent passageway leading into an undercut 25 in the bore through the retainer adapter 24. The vent 91 will vent to atmosphere any fluids leaking past either seal 88 or seal 92 and thereby give indication of such a leak.

Disposed within another groove within the retainer adapter bore is a wear ring 90 which purpose is to stabilize drive shaft 30. At the bottom of the counter bore provided in retainer 24 for cage retainer 44 is a resilient lip seal 92 to exclude the high pressure fluids in the annular chamber 44 and inlet 16 from invading into the space containing the wear ring 90.

An O-ring 94 is disposed in a groove located around the periphery of the flow cage 46 which main purpose is to hold the flow cage 46 into place during assembly of the parts as shown. Crown seals 96 and 98 are provided in spaced apart grooves defined around the outside of the seat sleeve 54 to provide a seal which carries the full differential pressure across the valve 10.

Metal seal rings 100 and 101 are provided respectively between the valve body 10 and the retainer adapter 24, and the valve body 10, and the outer member 18, to provide high pressure seals and some alignment between the respective members.

Contained within the outlet passage 20 of the outlet member 18 is a flow tube 102 which carries a tungsten carbide lining 104. The purpose of the flow tube 102 is to curtail the erosive effects of fluid and entrained solids as discharged from the seat sleeve 54 when the valve is in operation.

The liner 104 is also provided of diameter to serve as a "Flow Bean" in supplemental flow control. Thus, the flow tube 102 controls the upper limit of fluid flow through the valve 10. A hydraulic connection 106 extends through the wall of the cylinder 28 into the chamber defined within the cylinder 28 by the face of the piston 26.

In operation, hydraulic fluid is introduced through the connection 106 into the actuator 22 and thereby displaces the piston 26 into compressing the Belleville springs 40 and moving the drive shaft and inter-connected flow control member 66 or 68 from a closed position to various open positions.

As hydraulic fluid is released from acutator 22 through connection 106, the Belleville springs urges the piston 26 and the drive shaft toward closure of the valve 10 by moving the member 66 or 68 back into seating position of the seat 58 against the seat 72 or seat 76. Throttling of the valve member 66 is accomplished by the tapered nose 74. Throttling of the valve member 68 is accomplished by exposing more of the flow passages 78, away from the valve seat 58.

The control valve 10 as described with respect to FIGS. 1-4 is again shown schematically in FIG. 5 as connected into the control system which actuates the control valve 10. The valve 10 is connected into a wellhead or other piping 202 which brings product from a well bore through the valve and out through a product line 204.

A hydraulic power conduit 206 extends from the hydraulic linear actuator 22 through segments 206a, 206b, 206c to pump 208. The pump 208 has a conduit 210 extending to a sump and reservoir 212. The sump 212 receives hydraulic fluid returned from actuator 22 via conduit 214a and 214b as connected into conduit 206b.

A high pressure relief valve 216 is connected to the discharge of pump 208 in conduit 206c. A remotely actuated blocking valve 218 is connected into conduit 206 at 206c and 206b to block flow through conduit 206 unless the activating switching system is energized. A by-pass valve 220 is connected into return conduit 214 between 214b and 214a. The by-pass valve is normally held closed by an activating switch valve 222 when the activating system is energized. By-pass valve 220 is switched to open position for by-pass when high pressure of a prescribed magnitude switches the valve 222 which in turn switches the valve 220 from the closed to the opened by-pass position.

A pressure gage 224 is connected into hydraulic conduit 206c to give visual indication of the hydraulic power pressure.

An activating pilot signal "APS" is brought into the system through a conduit 226, shown in segments 226a, 226b, 226c, 226d, 226e and 226f. The activating signal APS passes through a switch valve 228 via conduit 226d and 226e to switch the blocking valve 218 into open position to permit flow through conduit 206. The activating APS signal is also passed through conduit 226d to switch a switch valve 230 which is switched open to permit air to the air motor of pump 208 from a pressure regulator 232 which is connected from an air supply 234. A pressure gauge 244 connected to air supply 234 gives visual indication of the air pressure.

The activating APS signal also passes from conduit 226a through conduit 226b and conduit 226c to switch valve 222 and on through a conduit 226f to the hydraulic return by-pass valve 220 as previously mentioned.

An emergency shut-off switch valve 236 is in conduit 226 between 226a and 226b. The purpose of shut-off switch valve 236 is to block the activating APS signal and exhaust the signal from the switching valve 218, 220 and 230, and thereby to shut down the hydraulic power system to actuator 22 and to return the hydraulic fluid from actuator 22 via conduit 214 to the sump 212.

The emergency shut-off switch 236 as shown also provides a signal through a conduit 248 to a by-pass switch valve 250 which is connected into conduit 206a between the actuator 22 and the adjustable control valve 242. When so connected, actuation of the emergency valve 236 stops the signal to the by-pass valve 250 which blocks off fluid flow from throttle valve 242 and vents the hydraulic fluid from actuator 22 through connector 106 and conduit 206a directly to sump 212 through the conduit 214. Thus, this is an emergency override to the system as previously described which will still function as previously described. The signal through conduit 248 may be supplied by a second emergency safety valve, for example (not shown), mechanically coupled with valve 236 for joint actuation.

An adjustable hydraulic control valve 242 is connected into hydraulic conduit 206 between 206a and 206b to control the rate of flow of hydraulic fluid through the conduit 206 and the connection 106 into and out of linear actuator 22. The function of control valve 242 is to prevent slam or hammer of the valve 10 in operation, to prevent cyclic "hunting" in the control system, and also to control the rate of change of flow through the valve by controlling the rate of change in position of either the valve member 66 or 68 in the seat sleeve 54.

This rate of change can be very widely adjustable. For example, the rate of travel from closed to full opening of the control valve 10 can be within a time period as small as one second to a time period of 90 seconds or more, as desired. Other ranges and time periods can be provided for a particular installation of a valve 10 and a particular size of valve 10.

A hydraulic connection 238 into the product line 204 is located downstream of the control valve 12. A product pressure conduit 240 is connected from connection 238 to switch valve 222 and to switch valve 228. A pressure guage 246 connected into conduit 240 gives indication of the product pressure.

The switch valve 228 is a high-low switch valve such as provided by "Amot", which deactivates the activating APS signal at product pressures below 2,000 p.s.i. for example, and above 4,000 p.s.i., for example. Similarly the switching valve 222 is provided to be switched open by pressure through line 240 and thereby to close the by-pass valve 220 when the product pressure is below a prescribed set pressure 3,500 p.s.i. for example, and above at 2,800 p.s.i., for example.

The downstream connection 238, in conjunction with switch valves 228 and 222, therefore provides for manipulation of the control valve 12 in response to the pressure sensed in the product stream 204. Through the connection 238, in response to a high pressure signal, the by-pass valve 220 will open, the blocking valve 228 will close and the pump 208 will be switched off. Similarly in response to a low pressure signal, the pump 208 will be switched on, the valve 218 will be switched open and the valve 220 will be switched closed.

It is to be noted that all of the switching as described could be performed electrically rather than with fluid pressure, as disclosed, whereby the valves 230, 218, and 220 would be switched electrically and the activating APS signal would be an electrical voltage with appropriate switches 236, 228 and 222 to handle this APS voltage.

It is to be noted also that the pressure connection 238 for the product pressure could be connected into the inlet or high pressure product line 202 and the equipment adjusted accordingly for wellhead pressure control rather than the valve discharge pressure control.

It is also to be noted that the valve 10 effects complete flow shut-off of product from the wellhead when closed, and thus combines the functions of a throttle valve as well as a positive shut-off valve. Here it is noted that the valve members 66 and 68 shown in FIGS. 2 and 3 are aided in positive shut-off by the pressure deferential across the area of the member 66 for member 68. This pressure deferential must of course be overcome by hydraulic pressure applied to the linear actuator 22 when the valve 10 is re-opened.

This function of positive shut-off as described is valuable in that this valve can gradually slow, then stop the flow, of product through the valve 10. Conventional gate block valves can then be closed without requiring their use as a throttling valve which is considered as undesirable in most incidences.

OPERATION OF THE PREFERRED EMBODIMENT

In operation, an APS signal is applied to conduit 226a which serves to open switch valve 230 to start pump 208; to open valve 218 to permit flow of hydraulic fluid to actuator 22; and to close by-pass valve 220.

Hydraulic fluid under pressure is then introduced through connection 106 into actuator 22 to open the valve 10 into throttling position.

The valve 10 is usually equipped with the valve member 66 shown in FIG. 2, when initially placed on a wellhead to control the initial and new flow of product from the well which may be a mixture of gas, distillate and oil, all of which will carry entrained cuttings, rust and other detritus until the well finally cleans itself out through flow. In the event that the production through the product continues to be oil, then the plug 66 may remain for continuing operation.

In the event that the cleaned up product is gas, then the valve member 66 may be exchanged for the valve member 68 shown in FIGS. 3 and 4 which provides a fine regulation of gas flow through the varied passages 78c, 78b and 78a. The members 66 and 68 are rather easily exchanged by merely uncoupling the coupler 32 and pulling all of the parts in the valve operating chamber 14 down to the seat sleeve 54, or including the seat sleeve 24. The replacement valve member is assembled as shown and the entire assembly then slipped back into the operating chamber 14 and the coupler 32 is brought back into tight connection.

It is also noted that the flow tube 102 can be removed and exchanged as well when such a change is made.

Other embodiments which differ from the invention as illustrated and disclosed herein may occur to those skilled in the art. It is to be noted that the invention is not confined to the disclosed embodiment but rather by the purview of the appended claims.

What is claimed is:

1. A pilot operated flow control valve comprising:
   (a) a valve body defining an operating chamber extending through said body and a flow inlet passage intersecting said operating chamber;
   (b) a flow outlet member defining a discharge outlet passage connected to said valve body with said outlet passage in alignment with said operating chamber;
   (c) hydraulic linear actuator means connected to said valve body in alignment with said operating chamber and including a piston enclosed in a cylinder, a drive shaft extending into said operating chamber, and compression spring return means biased in compression against said piston to urge said drive shaft into said operating chamber;
   (d) a seat sleeve carrying a valve seat and an internal lining of prescribed material mounted at the flow outlet of said operating chamber;
   (e) carrier means connected to said drive shaft and carrying a flow control member of prescribed configuration and material into and out of said valve seat sleeve to close off flow through said sleeve with extension of said drive shaft into said operating chamber, and to open said sleeve to flow with retraction of said flow control member;
   (f) said flow control member and said valve seat defining complementary tapered seats to cause complete flow closure with appropriate extension of said drive shaft;
   (g) said flow control member defining a prescribed flow regulating structure extending from its tapered seat into said seat sleeve;
   (h) hydraulic conduit means connected into said cylinder to admit hydraulic fluid under pressure to move said piston and to compress said spring means;
   (i) disengageable activator means for activating control apparatus into operative mode responsive to an activating pilot signal;
   (j) adjustable flow throttling means connected into said conduit means adjacent said actuator means to adjustably control the rate of travel of said piston by adjusting the flow rate of hydraulic fluid into and out of said actuator means; and
   (k) product pressure sensing means connected into the product pipe connected downstream from said control valve and further connected to close said control valve when a prescribed high product pressure occurs and to open said control valve when a prescribed low product pressure occurs.

2. The control valve of claim 1 further including emergency switching means which responds to disengage said activator means arbitrarily.

3. Control apparatus for a wellhead flow control valve comprising:
   (a) hydraulic actuator means connected to said control valve and including a piston inclosed in a cylinder, a drive shaft extending into said control valve, and resilient compression spring means bias against said piston to urge said drive shaft into said valve;

(b) conduit means connected into said cylinder to admit hydraulic fluid under pressure to move said piston and to compress said spring means;

(c) hydraulic pump means to supply hydraulic fluid through said conduit means to actuate said actuator means;

(d) disengagable activator means responsive to an activating pilot signal: to start and operate said hydraulic pump; to keep closed a bypass valve in fluid connections between said conduit means and the sump of said pump; and to keep open a blocking valve connected into said conduit means between said pump and said actuator means;

(e) adjustable flow throttling valve means connected into said conduit means adjacent said actuator means to adjustably control the rate of travel of said piston by adjusting the rate of flow of hydraulic fluid into and out of said actuator means;

(f) product pressure sensing means connected into the product pipe connected downstream from said control valve and further connected to intercept pilot signal of said activator means to stop said pump and to close said valve when a prescribed product pressure occurs and to start said pump and to open said control valve when a prescribed low pressure occurs.

4. The control apparatus of claim 3 further including emergency switching means which responds to disengage said activator means arbitrarily.

5. The control valve of claim 1 wherein all of the internal parts of said valve may be removed from said control valve and replaced while said valve remains connected into product pipe connections.

6. The control valve of claim 5 wherein said compression spring return means comprise a group of Belleville springs.

7. The control apparatus of claim 3 wherein said compression spring means comprises a stacked group of Belleville springs.

8. The control valve of claim 1 wherein said resilient spring means comprises a stacked group of Belleville springs.

9. The control valve of claim 2 wherein said emergency switching means further switches a by-pass valve means to directly vent hydraulic fluid from said actuator means.

10. The control apparatus of claim 4 wherein said emergency switching means further switches a by-pass valve means to directly vent hydraulic fluid from said actuator means.

* * * * *